Dec. 29, 1959  J. A. JANUS  2,919,028
COMBINED OIL DEPTH GAUGE AND FILTER
Filed March 5, 1959  2 Sheets-Sheet 1
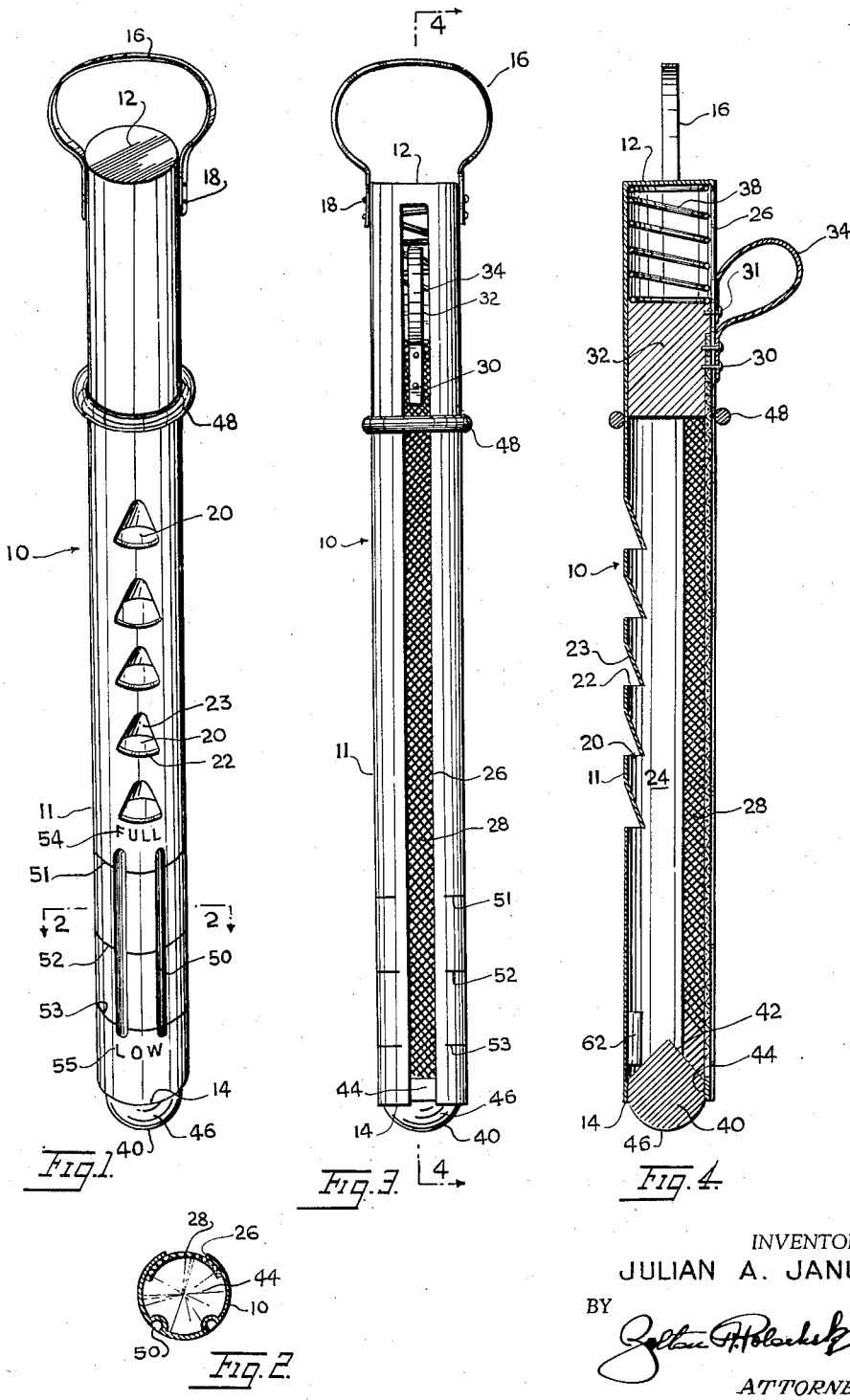
INVENTOR.
JULIAN A. JANUS
ATTORNEY

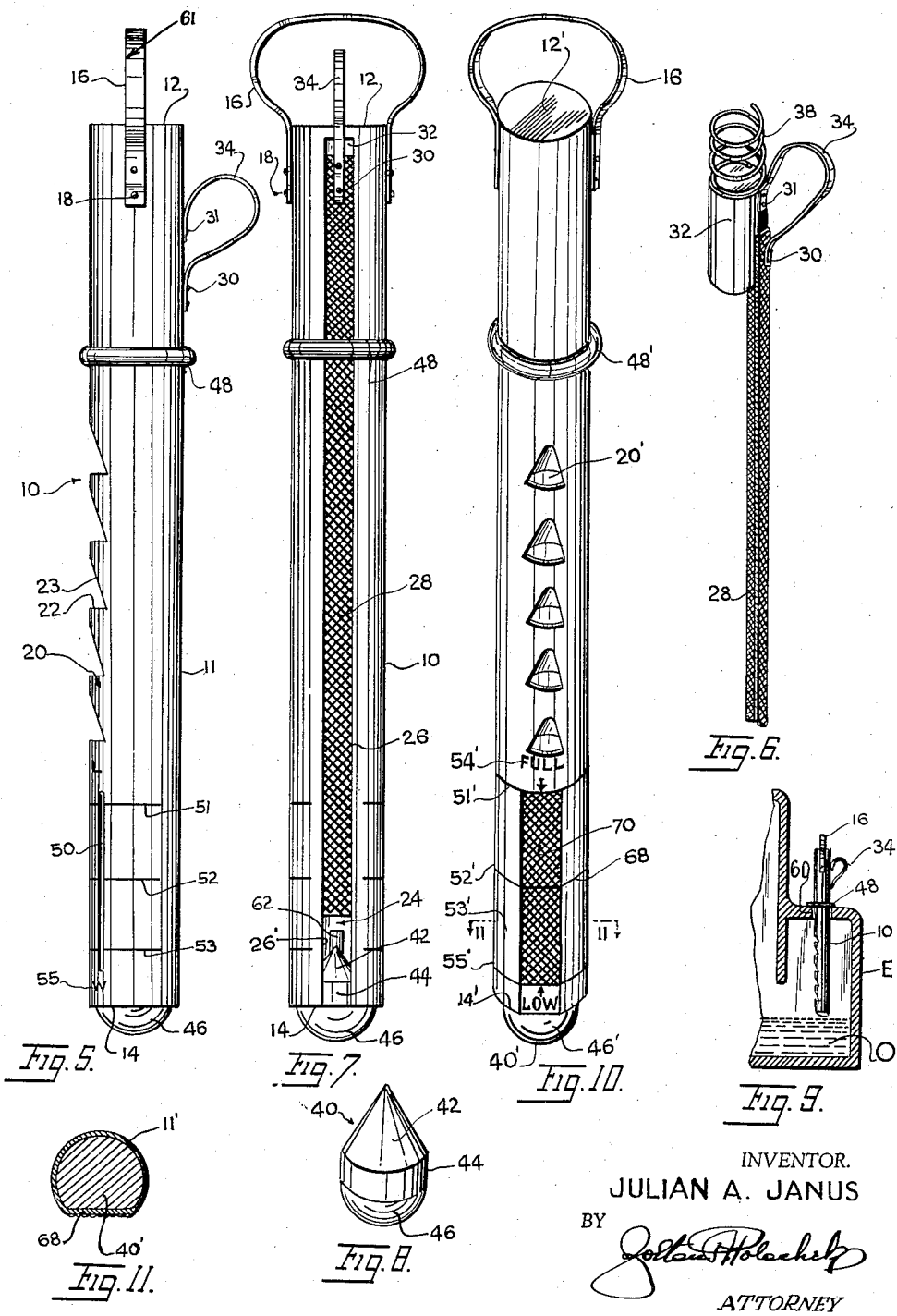

United States Patent Office 2,919,028
Patented Dec. 29, 1959

2,919,028

COMBINED OIL DEPTH GAUGE AND FILTER

Julian A. Janus, Brooklyn, N.Y.

Application March 5, 1959, Serial No. 797,416

14 Claims. (Cl. 210—223)

This invention concerns an oil depth gauge and filter especially adapted for use in an internal combustion engine of a vehicle such as an automobile, bus, truck and the like.

According to the invention there is provided a tubular device adapted to fit in the dip-stick hole usually provided in engine blocks of internal combustion engines. The device is provided with oil level markings. Permanently disposed within a chamber in the device there is a screen for straining oil which passes into the chamber through openings in the side of the device and which passes out of the chamber through the screen. The screen is held in position under a spring bias and is slidable against this bias to provide an opening through which accumulated debris can be discharged from the device. The device has a permanent magnet at one end for collecting iron and other magnetizable particles which may be present in the oil in the crankcase of the engine block. An alkaline pill may also be disposed in the chamber for neutralizing acid which develops in the oil during use.

It is therefore a principal object of the invention to provide a combination oil gauge and depth filter for an internal combustion engine.

It is a further object to provide an oil gauge and depth filter in the form of a tubular device having a chamber wall formed by a movable fine mesh screen of standard or graduated type.

It is a further object to provide a combined oil gauge and depth filter with magnet means for collecting magnetizable particles.

It is a still further object to provide an oil gauge and depth filter with acid neutralizing means.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front perspective view of an oil depth gauge and filter embodying the invention.

Fig. 2 is a cross-sectional view taken on line 2—2 of Fig. 1.

Fig. 3 is a rear elevational view of the device.

Fig. 4 is a longitudinal sectional view taken on line 4—4 of Fig. 3.

Fig. 5 is a side elevational view of the device.

Fig. 6 is a perspective view of the filter screen and spring biasing means.

Fig. 7 is a rear elevational view similar to Fig. 3 showing the filter screen in a retracted position.

Fig. 8 is a perspective view of the magnet used in the device.

Fig. 9 is a fragmentary sectional view of a crankcase of an internal combustion engine showing the device inserted therein for filtering and measuring the level of oil therein.

Fig. 10 is a view similar to Fig. 1 showing still another modification of the invention.

Fig. 11 is a cross-sectional view taken on the plane of the line 11—11 of Fig. 10.

Referring to the drawings, there is shown an oil depth gauge and filter 10 including a cylindrical tubular metal case 11 having a closed top end 12 and an open lower end 14. Adjacent the top end is mounted a loop handle 16 by rivets 18, welding or the like. The case has a plurality of longitudinally spaced openings 20 formed by short circumferential cuts which define lips 22. The metal above the lips is pressed inwardly to form guide channels 23 so that oil which is splashed up on the case during use passes into the chamber 24 inside. The side of the case diametrally opposite the opening 20 is formed with a longitudinal slot 26 extending substantially the length of the case. Within the chamber and normally closing the slot there is an elongated partially cylindrical fine mesh screen 28 through which the oil drains from chamber 24. The screen may be of the standard or graduated type.

Screen 28 is secured by rivet pins 30 to a cylindrical plug 32, as clearly shown in Figs. 4 and 6. Also attached to the plug by rivet pins 30 and 31 is a loop handle 34. This handle extends radially outward from the case in a plane perpendicular to the plane of handle 16. On the plug 32 is mounted a coil spring 38. This spring fits beneath the closed end 12 of the case and is tensioned to bias the screen downwardly toward the bottom end of the case. The bottom end of the case is closed by a plug 40 which is a permanent magnet made of alnico metal or the like. The magnet has a general conical top end 42, a cylindrical center section 44 and a bottom end 46 which is spherically curved and which projects out of the bottom of the case. The magnet may be secured in the case by welding the wall of section 44 to the interior of the case at the bottom end.

A ring 48 is disposed on the outside of the case just above openings 20 and limits the depth of penetration of the device into the oil O contained in the crankcase of engine E as shown in Fig. 9. The ring also seals the joint against leakage.

A plurality of longitudinal grooves or depressions 50 are formed in the wall of the case between the lowermost of the openings 20 and the bottom end of the case. These depressions are crossed by transverse line 51, 52, 53 cut in the case and marked with the numerals 54 and 55 to indicate "Full" and "Low" levels of the oil. The depressions 50 serve to collect oil so that when the device is withdrawn from the engine, there can be no mistaking the true level of oil in the crankcase.

In operation of the device, the case 11 is inserted into the tank of oil through the dip-stick opening 60 in the engine block. An arrow 61 is preferably formed on the loop handle 16 pointing to the proper direction for facing the oil depth gauge on the engine block when inserting the depth gauge in the engine block. The device may be vertically disposed as shown in Fig. 9 or it may be disposed at an angle to the vertical. Oil is continually being splashed upon the device while the engine is running. The splashed oil runs down the side wall of the case and enters through the openings 20 into the chamber 24 from which it drains through the fine openings in the screen 28.

A cylindrical or spherical cartridge 62 consisting of an alkaline substance may be disposed within the case 11. This cartridge will react with acid which forms in the oil during use to neutralize the acid so that the useful life of the oil is prolonged. In addition, the screen 28 will hold back all foreign particles too large to pass through the fine openings in the screen.

At the upper end of the magnet 40 there will be collected iron and other magnetizable particles which accumulate in the oil from the wearing moving parts and other sources during use. The bottom end 46 of the magnet projects out of the case. This end will also collect magnetizable particles from the oil.

In order to clean the chamber 24, the screen 28 is retracted as shown in Fig. 7 by manually pulling upward on handle 34 against the bias of spring 38. This opens up the slot 26 at the bottom of the case as indicated at 26'. The accumulated foreign matter can easily be removed from the case by shaking same out through this opening 26' and by wiping with a cloth. If desired, the chamber 24 can be washed out with kerosene or benzine to complete the cleaning operation. After the chamber 24 is clean, the handle 34 will be released to restore the screen to its normal position as shown in Figs. 3 and 4, fully closing the slot 26 in the case.

There has thus been provided a simple, rugged device which will increase the useful life of the oil in the engine without the use of the complicated structures and expense of conventional oil filters. At the same time, the oil filter serves as an oil gauge. Each time the device is withdrawn to inspect the oil level, the condition of the filter and whether or not it needs cleaning are readily apparent. The present device fits into the usual dip-stick hole so that it can be used to replace the conventional dip-stick oil gauge which performs no filtering function. The device takes advantage of the splashing of the oil, which occurs constantly within the engine crankcase, to effect cleaning of the oil. This is an improvement over conventional filters which normally operate in a different manner.

The form of gauge and filter shown in Figs. 10 and 11 is similar to the form shown in Fig. 1 except that in place of the grooves or depressions 50, the case 11' at the bottom is flattened as indicated at 68 and the surface of the flattened portion is formed in any suitable manner with serrations 70. The serrations serve to collect oil so that when the device is withdrawn from the engine, the true level of the oil can be seen at a glance.

The magnet 40' is flattened at one side to conform to the shape of the flattened bottom end of the case as seen in Fig. 11. The magnet prevents grit and foreign particles from reentering the crankcase while the screen is withdrawn for cleaning the same.

In all other respects the form of gauge and filter shown in Figs. 10 and 11 is similar to the form of Fig. 1 and similar reference numerals with primes added thereto are used to indicate similar parts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a combined oil gauge and filter, a cylindrical tubular case, said case having a plurality of spaced openings in the wall thereof for receiving oil splashed thereon by an engine, said case having an elongated slot in the wall thereof, and a screen slidably and removably covering said slot for straining oil entering the case through said openings.

2. A combined oil gauge and filter, comprising a cylindrical tubular case, with a plurality of oil level indicia marked on the wall thereof near one end thereof, said case having a plurality of longitudinal depressions in the wall thereof near said end to collect oil for clearly indicating the level of the oil in a container, said case having a plurality of spaced openings therein for receiving oil splashed therein during operation by an engine, said case having an elongated slot therein opposite said openings, and an arcuate screen slidably and removably covering said slot for straining oil entering the case through said openings.

3. A combined oil gauge and filter, comprising a cylindrical tubular case, said case having a plurality of openings longitudinally spaced in one side thereof for receiving oil splashed on the case, and a longitudinal slot in a side opposite from said openings, and a screen slidably and removably covering said slot for straining the oil entering the case through said openings.

4. A combined oil gauge and filter, comprising a cylindrical tubular case, said case having a plurality of openings longitudinally spaced in one side thereof for receiving oil splashed on the case, and a longitudinal slot in a side opposite from said openings, and a screen slidably and removably covering said slot for straining the oil entering the case through said openings, said case having a bottom end closed by a permanent magnet for collecting magnetizable particles in the oil.

5. A combined oil gauge and filter, comprising a cylindrical tubular case, said case having a plurality of openings longitudinally spaced in one side thereof for receiving oil splashed on the case, and a longitudinal slot in a side opposite from said openings, and a screen slidably and removably covering said slot for straining the oil entering the case through said openings, said case having a bottom end closed by a permanent magnet for collecting magnetizable particles in the oil, and an alkaline cartridge in the case for neutralizing acid in the oil passing through the case.

6. A combined oil gauge and filter, comprising a cylindrical tubular case, said case having a plurality of openings longitudinally spaced in one side thereof for receiving oil splashed on the case, and a longitudinal slot in a side opposite from said openings, and a screen slidably and removably covering said slot for straining the oil entering the case through said openings, said case having a bottom end closed by a permanent magnet for collecting magnetizable particles in the oil, said magnet having a conical end projecting into the case and a curved end projecting outwardly beyond the bottom end of the case.

7. A combined oil gauge and filter, comprising a cylindrical tubular case, with a plurality of oil level indicia marked on the wall thereof near one end thereof, said case having a plurality of longitudinal depressions in the wall thereof near said one end to collect oil for clearly indicating the level of the oil in a container, said case having a plurality of spaced openings in one side to provide entrance into the case of oil splashed on the case, said case having a longitudinal slot in a side opposite to said openings, a long arcuate screen covering the longitudinal slot, spring means holding said screen in covering position in the slot, a first handle attached to the other end of said case, and a second handle attached to said screen for retracting the screen to uncover part of said slot and facilitate cleaning of the case.

8. A combined oil gauge and filter, comprising a cylindrical tubular case, with a plurality of oil level indicia marked on the wall thereof near one end thereof, said case having a plurality of longitudinal depressions in the wall thereof near said one end to collect oil for clearly indicating the level of the oil in a container, said case having a plurality of spaced openings in one side to provide entrance into the case of oil splashed on the case, said case having a longitudinal slot in a side opposite to said openings, a long arcuate screen covering the longitudinal slot, spring means holding said screen in covering position in the slot, a first handle attached to the other end of said case, and a second handle attached to said screen for retracting the screen to uncover part of said slot and facilitate cleaning of the case, and a permanent magnet closing one end of the case for collecting magnetizable particles from the oil.

9. A combined oil gauge and filter, comprising a cylindrical tubular case, with a plurality of oil level indicia marked on the wall thereof near one end thereof, said case having a plurality of longitudinal depressions in the wall thereof near said one end to collect oil for clearly indicating the level of the oil in a container, said case having a plurality of spaced openings in one side to provide entrance into the case of oil splashed on the case, said case having a longitudinal slot in a side opposite to said openings, a long arcuate screen covering the longitudinal slot, spring means holding said screen in covering position in the slot, a first handle attached to the other end of said case, a second handle attached to said screen for retracting the screen to uncover part of said slot and facilitate cleaning of the case, a permanent magnet closing one end of the case for collecting magnetizable particles from the oil, and a ring secured around said case between said openings and said other end of the case for limiting depth of penetration of the case into said oil.

10. A combined oil gauge and filter, comprising a cylindrical tubular case, with a plurality of oil level indicia marked on the wall thereof near one end thereof, said case having a plurality of longitudinal depressions in the wall thereof near said one end to collect oil for clearly indicating the level of the oil in a container, said case having a plurality of spaced openings in one side to provide entrance into the case of oil splashed on the case, said case having a longitudinal slot in a side opposite to said openings, a long arcuate screen covering the longitudinal slot, spring means holding said screen in covering position in the slot, a first handle attached to the other end of said case, a second handle attached to said screen for retracting the screen to uncover part of said slot and facilitate cleaning of the case, a permanent magnet closing one end of the case for collecting magnetizable particles from the oil, an alkaline cartridge in the case for neutralizing acid in the oil, and a ring secured around said case between said openings and said other end of the case for limiting depth of penetration of the case into said oil.

11. A combined oil gauge and filter comprising a tubular case having a closed end and an open end, the wall of said case having a plurality of longitudinally arranged spaced openings therein, on one side thereof, the wall of said case having an elongated slot extending substantially the length of the wall on the opposite side thereof, an elongated screen slidably and removably covering the slot in said wall, a handle on said screen for manipulating the same, a magnetic plug closing the open end of the case, the wall of said case having a flattened portion at the open end thereof below said openings, said flattened portion having serrations on the outer surface thereof.

12. A combined oil gauge and filter comprising an elongated hollow cylindrical case closed at both ends, the wall of said case having a plurality of longitudinally arranged spaced openings therein, a handle on one end of the case for manipulating the same, the closure of one end constituting a magnet for magnetically collecting magnetizable material in oil.

13. A combined oil gauge and filter comprising an elongated hollow cylindrical case closed at both ends, the wall of said case having a plurality of longitudinally arranged spaced openings therein, on one side thereof, said wall having an elongated slot extending substantially the length of the wall on the opposite side thereof, and an elongated screen slidably and removably covering the slot in said wall and a handle on said screen exteriorly of the case for manipulating the screen.

14. A combined oil gauge and filter comprising an elongated hollow cylindrical case closed at both ends, the wall of said case having a plurality of longitudinally arranged spaced openings therein, on one side thereof, said wall having an elongated slot extending substantially the length of the wall on the opposite side thereof, and an elongated screen slidably and removably covering the slot in said wall and a handle on said screen exteriorly of the case for manipulating the screen, said screen being selectively either a standard type screen or a graduated type screen.

No references cited.